(12) United States Patent
Wei et al.

(10) Patent No.: US 9,524,736 B2
(45) Date of Patent: Dec. 20, 2016

(54) GRAMOPHONE RECORD

(71) Applicant: ULVAC TAIWAN INC., Hsinchu (TW)

(72) Inventors: Yun-Hsiang Wei, Hsinchu (TW);
Hsien-Hui Wang, Hsinchu (TW);
Chien-I Mao, Hsinchu (TW)

(73) Assignee: Ulvac Taiwan Inc., Hsinchu (TW)

( * ) Notice: Subject to any disclaimer, the term of this patent is extended or adjusted under 35 U.S.C. 154(b) by 0 days.

(21) Appl. No.: 15/084,687

(22) Filed: Mar. 30, 2016

(65) Prior Publication Data
US 2016/0322070 A1 Nov. 3, 2016

(30) Foreign Application Priority Data

May 1, 2015 (TW) .............................. 104114046 A

(51) Int. Cl.
*G11B 3/70* (2006.01)
*G11B 3/72* (2006.01)

(52) U.S. Cl.
CPC .. *G11B 3/72* (2013.01); *G11B 3/70* (2013.01)

(58) Field of Classification Search
CPC .................................... G11B 3/70; G11B 7/24
USPC .................................... 369/277, 275.3, 275.4
See application file for complete search history.

(56) References Cited

U.S. PATENT DOCUMENTS

| | | |
|---|---|---|
| 2,555,274 A | 5/1951 | Metz |
| 2,678,895 A | 5/1954 | Belar et al. |
| 3,501,586 A * | 3/1970 | Russell .................. G11B 7/00 178/15 |
| 4,263,624 A | 4/1981 | Gundry |
| 5,277,984 A | 1/1994 | Nakamura et al. |
| 5,389,281 A | 2/1995 | Davies et al. |

FOREIGN PATENT DOCUMENTS

| | | |
|---|---|---|
| EP | 2442305 A1 | 4/2012 |
| TW | 539220 U | 6/2003 |

* cited by examiner

*Primary Examiner* — Allen T Cao
(74) *Attorney, Agent, or Firm* — McNees Wallace & Nurick LLC

(57) ABSTRACT

A gramophone record of the present disclosure includes a recording member and a functional member. The recording member has a main body that is made of a polymeric material and that defines a receiving area in a center thereof, and at least a groove formed on the main body. The functional member is disposed in the receiving area and is made of a material having a density greater than a density of the polymeric material of the main body.

7 Claims, 4 Drawing Sheets

GRAMOPHONE RECORD

CROSS-REFERENCE TO RELATED APPLICATION

This application claims priority of Taiwanese Patent Application No. 104114046, filed on May 1, 2015.

FIELD

The disclosure relates to a gramophone record, more particularly to a gramophone record that is made of materials having different densities, and that has a groove formed thereon.

BACKGROUND

Referring to FIG. 1, a conventional gramophone record 1 has a spiral groove 11 and an inner region 12. When a stylus 100 of a playback device 10 reads the groove 11 of the gramophone record 1, vibrations are generated and converted into electrical signals that ultimately produce music.

Due to a playback format and manufacturing process of the gramophone record 1, the inner region 12 of the gramophone record 1 is not formed with the groove 11. Thus, the inner region 12 would not serve any particular function. Therefore, a common practice during production of the gramophone record 1 is to heat press a record label (picture not shown) with molten polyvinyl chloride (PVC) onto the inner region 12 of the gramophone record 1.

The gramophone record 1 is considered to have economic value in the sense that it is able to generate analog signals to ultimately produce sounds that closely resemble the original. However, aside from holding the above-mentioned record label, which only serves to displays textual or graphical information about the gramophone record 1, the inner region 12 does not have any other added value.

Therefore, focusing on the development or design of the inner region 12 of the gramophone record 1 can help to enhance the economic value of the gramophone record 1 and stimulate the gramophone record market.

SUMMARY

Therefore, an object of the present disclosure is to provide a gramophone record that can alleviate at least one of the aforementioned drawbacks associated with the conventional gramophone record.

Accordingly, a gramophone record of the present disclosure includes a recording member and a functional member. The recording member has a main body that is made of a polymeric material and that defines a receiving area in a center thereof, and at least a groove formed on the main body. The functional member is disposed in the receiving area and is made of a material having a density greater than a density of the polymeric material of the main body.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
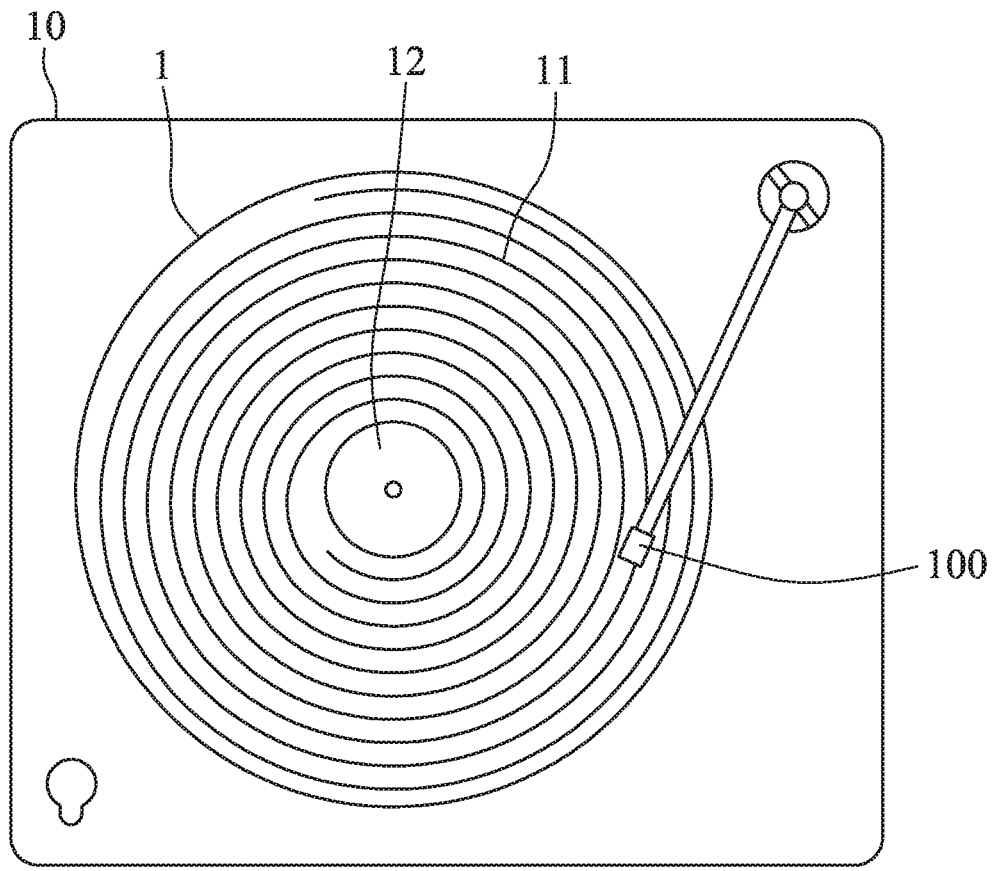
FIG. 1 is a top view illustrating a conventional gramophone record.
Figure 2:
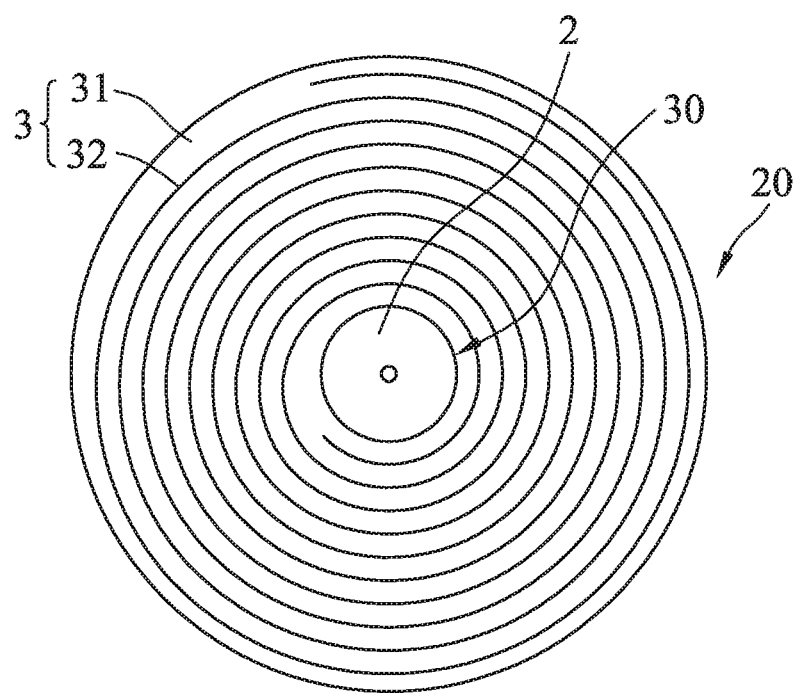
FIG. 2 is a top view illustrating an embodiment of a gramophone record according to the present disclosure.
Figure 3:
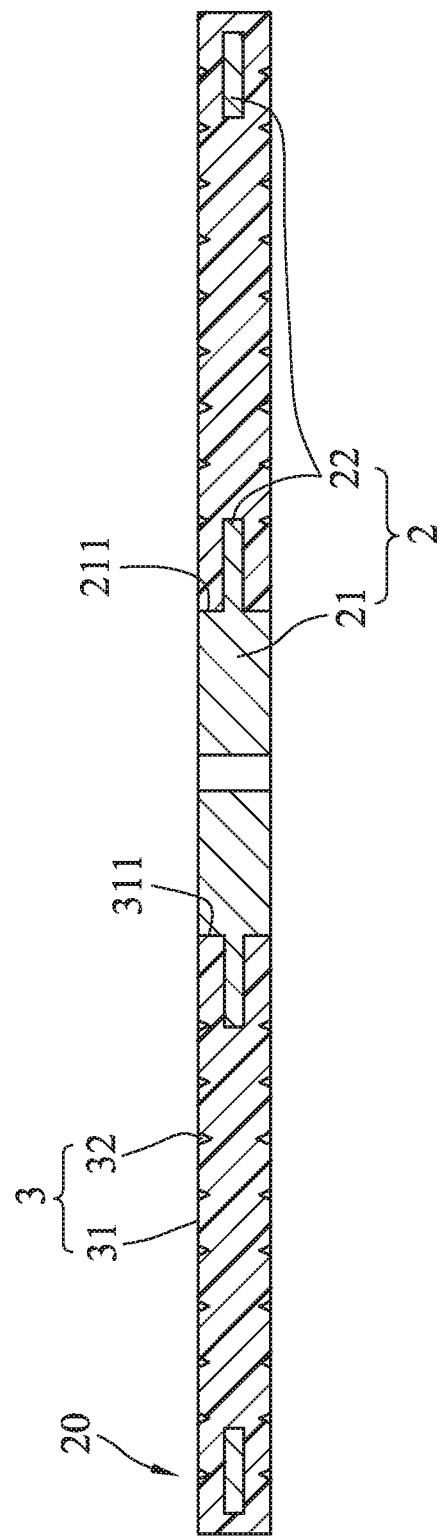
FIG. 3 is a sectional view illustrating the embodiment of FIG. 2.

Referring to FIGS. 2 and 3, an embodiment of a gramophone record 20 according to the present disclosure includes a recording member 3 and a functional member 2.

The recording member 3 has a main body 31 that is made of a polymeric material and that defines a receiving area 30 in a center of the main body 31.

The polymeric material may be polyvinyl chloride (PVC), polycarbonate (PC), polyetheretherketone (PEEK), polyimide (PI), polyoxymethylene (POM), or combinations thereof.

The recording member 3 also has at least a groove 32 formed on the main body 31. The groove 32 encircles the receiving area 30 to form a spiral shape on at least a portion of the main body 31. In the present embodiment, the grooves 32 are simultaneously formed on opposite sides of the main body 31.

Specifically, the main body 31 of the embodiment has an inner surrounding surface 311 that defines the receiving area 30. The receiving area 30 that is located in the center of the main body 31 may be in the form of a through hole, which passes through the main body 31 to form a hollow space. However, it should also be noted that the receiving area 30 is not limited to being in the form of a through hole. Instead, the receiving area 30 may be in the form of a blind hole, which does not entirely pass through the main body 31.

The functional member 2 is disposed in the receiving area 30, is connected to the inner surrounding surface 311 of the main body 31, and is made of a material having a density greater than a density of the polymeric material of the main body 31.

Preferably, the functional member 2 is made from a material, e.g., metal, alloy, ore, ceramic, wood, stained glass, or combinations thereof. It should be noted that the material of the functional member 2 is not limited to the disclosed materials, provided that the density of the material of the functional member 2 is greater than that of the main body 31.

The functional member 2 includes a central portion 21 having an outer surrounding surface 211, and a connecting portion 22 connected to and extending outwardly from the outer surrounding surface 211 of the central portion 21 into the main body 31. With the outer surrounding surface 211 connected to the inner surrounding surface 311 and the connecting portion 22 extending into the main body 31, the functional member 2 is connected to the main body 31 of the recording member 3. In certain embodiments, the functional member 2 and the main body 31 of the recording member 3 are inseparably connected by connecting the functional member 2 to the main body 31 during formation of the main body 31 using hot pressing.

Figure 4:
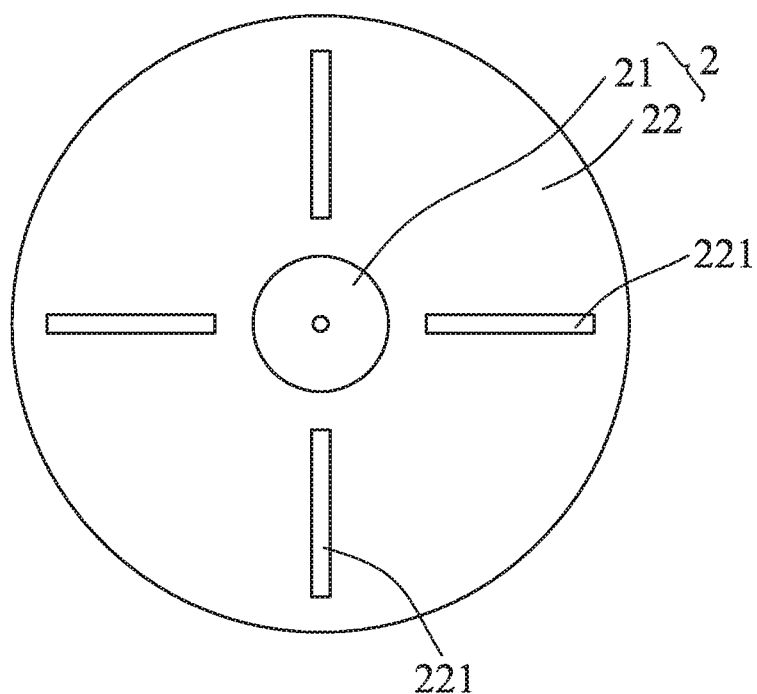
FIG. 4 is a top view illustrating a central portion and a connecting portion of a functional member of the embodiment shown in FIG. 3.

Referring to FIG. 4, the connecting portion 22 and the central portion 21 of the functional member 2 are integrally formed as one piece in the present embodiment. In this embodiment, the functional member 2 is in the form of a disc. It should be noted that the connecting portion 22 serves to enhance connection with the main body 31, and the shape thereof is not limited to this aspect of the disclosure.

For example, the connecting portion 22 may be in the form of a small part of an outwardly protruding ring structure (not shown), a radiating rim structure (not shown), or four symmetrical outwardly extending rectangular configurations (not shown). The connecting portion 22 may also be configured as recesses that are evenly or randomly distributed on the outer surrounding surfaces 211 of the functional members 2. Accordingly, the polymeric material of the main body 31 can fill the blind holes during the hot pressing process so as to increase binding strength between the main body 31 and the functional member 2.

In the present embodiment, the connecting portion 22 has several slots 221 through which the molten polymeric material can easily flow and encompass the functional member 2 during formation of the main body 31 via hot pressing. There is no limit to the number or shape of the slots 221, provided that the molten polymeric material of the main body 31 can pass through and encompass the connecting portion 22 of the functional member 2. This embodiment is illustrated by the four rectangular slots 221.

Because the material of the functional member 2 is different from that of the recording member 3, it is possible to increase the number of connecting portions 22 as well as an area of contact of the connecting portions 22 with the recording member 3 in order to enhance the bonding strength between the different materials. Furthermore, since the density of the material of the functional member 2 is greater than the density of the material of the recording member 3, when the connecting portion 22 of the functional member 2 further extends into the main body 31 (see FIG. 3), it can act as a support structure for the main body 31 to increase the rigidity and structural stability of the gramophone record 20. Thus, the relatively greater density of the functional member 2 can help to prevent the main body 31 from deformation and abnormal record playback that may result from environmental factors, e.g., high temperature exposure.

Moreover, during playback of the gramophone record 20, the stylus of a playback device rubs against the groove 32 of the gramophone record 20 resulting in static electricity buildup and sound distortions. Thus, if the material of the functional member 2 is electrically conductive, the static electricity on the groove 32 can be directed toward a central axis of the playback device (not shown) to prevent static electricity buildup.

It should be noted that the functional member 2 can be designed into a variety of types to accommodate varying demands of the market. For example, emphasis may be placed on the design or visual effect of the functional member 2, and involve polishing or carving of the functional member 2. It can also be designed with embroidery, oil painting, cowhide, porcelain glaze, stained glass, mosaics, and other decorative art pieces. It can also be made to accommodate a rotating music box, mechanical watch, moveable mechanical toy, and other mechanical structures, as well as a broadcasting device, a projector device, a search locator, a data transmission receiver, and other electronic devices.

Also, the main body 31 may be made to be transparent, and an electric circuit device and a battery film are installed into the central portion 21 of the functional member 2, such that the connecting region 22 can become a display device.

As previously mentioned, the functional member 2 and the recording member 3 can be inseparably connected. However, it should also be noted that the functional member 2 and the recording member 3 can be detachable from each other. In other words, the functional member 2 and the recording member 3 can be detachably connected with each other.

For example, an o-ring made from thermosetting polymer is used as a fixing member, and each of the inner surrounding surface 311 of the recording member 3 and the outer surrounding surface 211 of the functional member 2 is formed into a concave shape corresponding to the shape of the o-ring. The o-ring is sandwiched between the inner surrounding surface 311 and the outer surrounding surface 211 such that the functional member 2 can be connected with the main body 31 via the o-ring. Alternatively, the outer surrounding surface 211 of the functional member 2 and the inner surrounding surface 311 of the main body 31 may be formed with complementary threads so as to be screwed together. In another example, the outer surrounding surface 211 of the functional member 2 and the inner surrounding surface 311 of the main body 31 may use their respective size differences to become mutually fixed together in a puzzle-like manner, such that the functional member 2 can be received in the receiving region 30. When the receiving area 30 is the blind hole, a fixing member resembling a button-like protrusion may be formed in the blind hole, and a recess member may be formed in the functional member 2. The functional member 2 can be detachably connected to the recording member 3 through the connection between the fixing member and the recess member.

If the functional member 2 and the main body 31 are detachably connected, then the main body 31 and the functional member 2 can be individually manufactured. The functional member 2 can further be designed as, e.g., a universal series bus (USB), a ticket card having e.g., wireless radio frequency identification functions.

In summary, the functional member 2 can be inseparably or detachably connected to the recording member 3, is made of the material having a density greater than that of the recording member 3, and can be designed into a variety of types. Therefore, the economic value of the gramophone record 20 can be enhanced and the rigidity and the structural stability of the gramophone record 20 can be improved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. A gramophone record comprising:
   a recording member that has a main body made of a polymeric material and defining a receiving area in a center thereof, and at least a groove formed on said main body; and a functional member that is disposed in said receiving area and that is made of a material having a density greater than a density of said polymeric material of said main body.

2. The gramophone record as claimed in claim 1, wherein said main body has an inner surrounding surface that defines said receiving area, said functional member being connected with the inner surrounding surface of said main body.

3. The gramophone record as claimed in claim 1, wherein said groove encircles the receiving area to form a spiral shape on said main body.

4. The gramophone record as claimed in claim 3, wherein said receiving area is in the form of a through hole.

5. The gramophone record as claimed in claim 4, wherein said receiving area is in the form of a blind hole.

6. The gramophone record as claimed in claim 1, wherein said functional member includes a central portion, and a connecting portion connected to and extending outwardly from said central portion, said central portion and said connecting portion being connected to said recording member.

7. The gramophone record as claimed in claim 6, wherein said central portion has an outer surrounding surface, said connecting portion being connected to and extending from said outer surrounding surface into said main body.

* * * * *